Oct. 28, 1969 TADAMICHI MORI ET AL 3,474,713
AUTOMATIC CAMERA SHUTTER TIMING SYSTEM
Filed Feb. 16, 1967 3 Sheets-Sheet 1
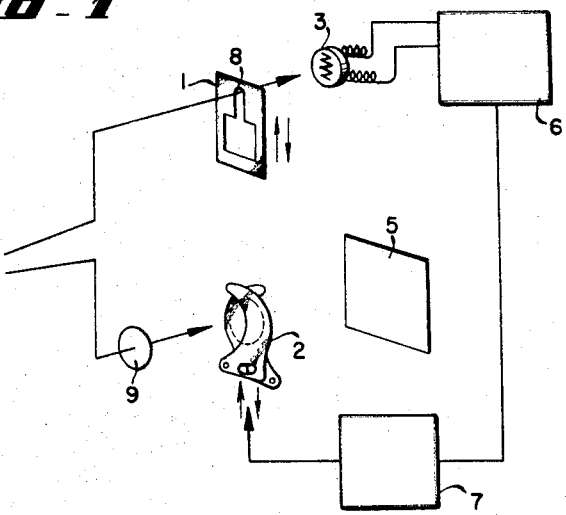
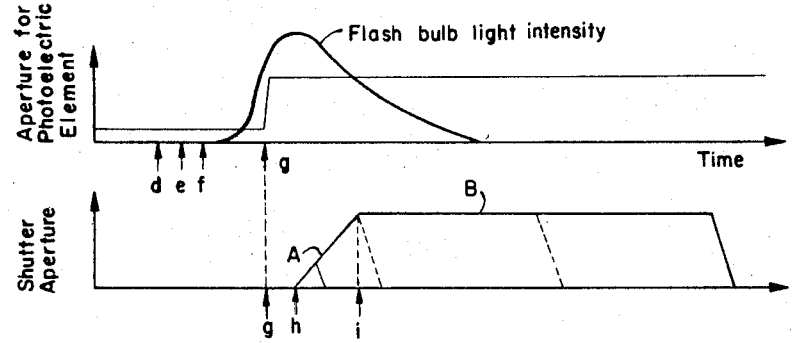
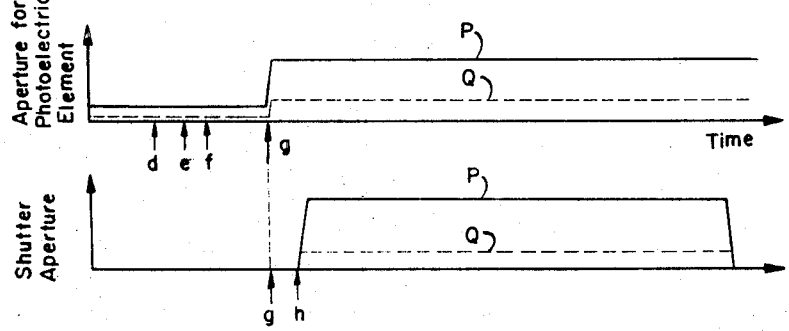
INVENTORS
TADAMICHI MORI
KOJI TANABE
BY Stanley Wolder
ATTORNEY : 3,474,713
Patented Oct. 28, 1969

3,474,713
AUTOMATIC CAMERA SHUTTER TIMING SYSTEM
Tadamichi Mori, Kitatama-gun, Tokyo-to, and Koji Tanabe, Higashi-murayama-shi, Tokyo-to, Japan, assignors to Citizen Tokei Kabushiki Kaisha, Tokyo-to, Japan, a corporation of Japan
Filed Feb. 16, 1967, Ser. No. 616,603
Claims priority, application Japan, Feb. 19, 1966, 41/10,018
Int. Cl. G01j 1/00, 1/52; G03b 9/00
U.S. Cl. 95—10       13 Claims

ABSTRACT OF THE DISCLOSURE

A pair of photoconductors are connected in series across a source of current and exposed to light incident on the camera, a masking element being movable across one photoconductor between high and low light attenuating positions. The other photoconductor is connected to the input of a switch network whose output is connected to an electromagnet which controls the closing of the camera shutter. The mask is moved from its high attenuation to its low attenuation position with the opening of the shutter so that the resistance of the registering photoconductor decreases with time in accordance with the light intensity to a value which effects the actuation of the switch to close the shutter. A fixed resistor may be substituted for the other photoconductor and the attenuation sequence may be reversed so that the light incident on the first photoconductor is decreased with the shutter opening.

BACKGROUND OF THE INVENTION

The present invention relates generally to improvements in automatic exposure cameras and it relates specifically to an improved light responsive automatic shutter timing control system.

The automatic exposure of a camera is generally accomplished by regulating the diaphragm aperture, the shutter open time or both in response to the camera incident light. A conventional system for controlling the shutter exposure time is by the use of a timing network including a capacitor and a photoconductor exposed to the ambient light. Such networks are complex and expensive, frequently unreliable and of little versatility. Moreover, when the photographed object is illuminated by a flash bulb and considerable ambient light is present the exposure regulating means is substantially ineffectual in compensating for the ambient light conditions.

SUMMARY OF THE INVENTION

A photoelectric element, such as a cadmium sulfide photoconductor cell, has a certain electric characteristic, that is, its resistance, which responds to the intensity of the incident light. The response delay time of such electric characteristic varies with the intensity of the incident light. In the present invention, such response delay time variation is related to an exposure time control.

In a sense the present invention contemplates the provision of an automatic exposure camera comprising a shutter, means for effecting the opening of said shutter, a photosensitive element exposed to light incident on said camera, means responsive to an electrical characteristic of said photosensitive element for effecting the closing of said shutter, and means responsive to said shutter opening means for varying the attenuation of said incident light directed to said photosensitive element. The photosensitive element is a photoconductor, whose resistance varies with the intensity of the light incident thereon and, up to its steady state, the time it is exposed to such light. The attenuation means is advantageously a mask which is movable across the photoconductor to a high attenuation position when the shutter is closed and to a low attenuation position at or immediately prior to the opening of the shutter. In accordance with a preferred form of the present system a second photoconductor exposed to the camera incident light is connected in series with the first photoconductor across a current source and the voltage drop across the second photoconductor controls a switch network whose output is connected to an electromechanical transducer which controls the closing of the camera shutter. The second phtooconductor may be a fixed resistor.

BRIEF DESCRIPTION OF THE DRAWINGS

FIGURE 1 is a schematic diagram of a system embodying the principle of the present invention;
FIGURE 2 is a graph illustrating the sequence of operations of an embodiment of the present invention;
FIGURE 3 is a graph illustrating the sequence of operations of another embodiment of the present invention.

DESCRIPTION OF THE PREFERRED EMBODIMENTS

Figure 4:
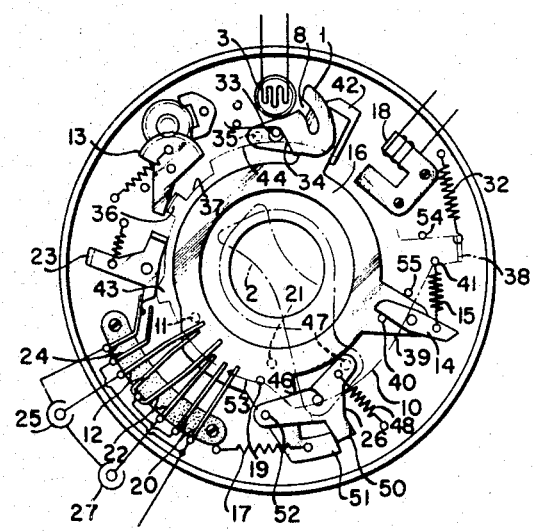
FIGURE 4 is a front elevational view of the shutter mechanism of a preferred embodiment of the present invention with the shutter in an uncocked position.

In the practice of the present invention, it is necessary that the intensity of the light incident on a photosensitive element change before photographing operation so as to obtain a time responsive signal of measurement. In the examples hereinafter described, the incident light is attenuated or weakened before the photographing operation, and for this purpose a shield plate 1 is provided. Normally the light is attenuated as it passes through the narrow slit 8 in the shield plate 1 and impinges upon a photoelectric element 3.

When the shutter release button (not shown) is depressed, the current source switch for the entire control network is closed, and then the shield plate 1 rapidly moves upward, as viewed in FIG. 1, so that the variation with time of the intensity of the light incident upon the photoelectric element 3 is of approximately rectangular waveform as shown in FIG. 2. The shutter blades, regulating the light amount from the object admitted through the objective 9, are then opened and the image of the object is formed upon the film 5.

When the intensity of the light incident upon the photoelectric element 3 changes rapidly, an electrical response or property (generally electrical resistance) of the photoelectric element 3 begins to change toward a steady state until it reaches a certain value at which the input voltage to the switching circuit 6 reaches a predetermined trigger voltage value so that the state of the switching circuit 6 is reversed and sends a signal to an electromechanical transducer 7, which results in closure of the shutter blades 2.

The photoelectric element 3 preferably possesses a relatively slow light response, such as a cadmium sulfide (CdS) cell. However, a slow response photoconductor element is generally unstable because it is highly influenced by light hysteresis phenomenon, resulting in difficulty in attaining exposure control accuracy. The light history effects may be eliminated in a very large measure and over considerable object brightness range by utilizing before shutter actuation an initial incident light of somewhat lower level than that of the incident light with the shield plate 1 fully open. For example, in the shield plate 1 in FIG. 1, owing to the slit 8, a certain amount of light falls on the photoelectric element 3 before shutter actuation.

Thus, exposure amount difference is very slight between one case in which the diaphragm remains open for a long time, and another case in which the shutter is repeatedly actuated in a short time. If exposure error due to light history effects is tolerable, of course, the light from the object may be rapidly shifted from an entirely attenuated or blocked state to the state where it impinges upon the photoelectric element 3. This initial incident light method provides the advantage of not only light history effects elimination but also of varying the functional relation between object brightness and exposure time by varying the ratio of the initial incident light intensity to the final incident light intensity with the shield plate 1 in its fully open low lght attenuation position.

In the embodiment shown in FIG. 4, the shield plate 1 is pivoted to the base plate by a pin 33 and urged counterclockwise by a spring 34. A pin 35 abuts the periphery of a set ring 10 to limit the swing of the shield plate 1. The set ring 10 is rotatably mounted coaxial with the optical axis, and upon clockwise rotation thereof against the action of a spring 32, owing to the movement of a pin 11 insulatedly secured to the set ring 10, an electronic flash switch 12 is opened, a governor 13 is disengaged from a projection 36 to return to the original position, and as the pin 35 of the shield plate 1 falls into a recess 37, the shield plate 1 is rotated counterclockwise so as to cover a photoelectric element 3.

Figure 5:
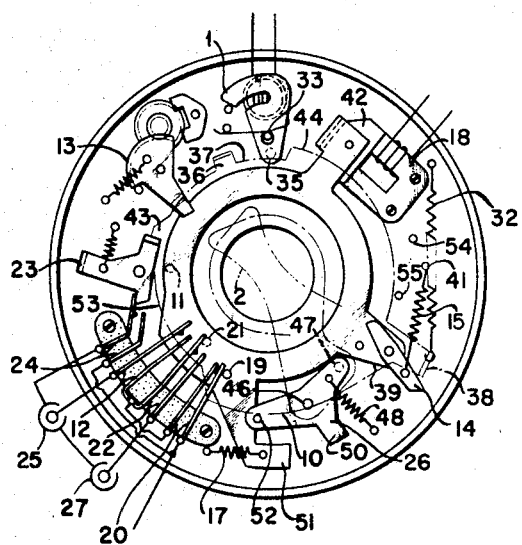
FIGURE 5 is a view similar to FIGURE 4 with the shutter in a cocked position.

Then, an arm 38 of the set ring 10 abuts a closing lever 14 which is pivoted to the arm 39 of a closing ring 16 with a closing ring spring 15 attached to a fixed pin 41 and with one end of the lever 14 abutting a pin 40. The lever 14 is thus swung clockwise as seen in FIG. 5, so that the spring 15 is tensioned and owing to the action of a spring 17 the closing ring 16 follows the set ring 10 and an iron piece or armature 42 pivoted to the closing ring 16 is caused to engage an electromagnet 18. At the same time, a safety switch 20 is closed by a pin 19 insulatedly fixed to the closing ring 16. A flash bulb switch 22 is then opened by a pin 21 insulatedly secured to the set ring 10, and the set ring proceeds to be locked with its stepped portion 43 engaging a release lever 23, thus being brought to a cocked or charged state (FIG. 5).

A lever 26 for operating a shutter blade 2, with a pin 47 serving as a movable fulcrum thereof, is pivoted to the base plate by a pin 46, is urged clockwise by a spring 48 and has its arm 50 abutting against the arm 51 of the ring 16. Upon rotation of the ring 16 the operating lever 26 tends to swing but its pin 52 abuts against the peripheral surface of the set ring 10 so that the shutter blade 2 remains closed.

Figure 6:
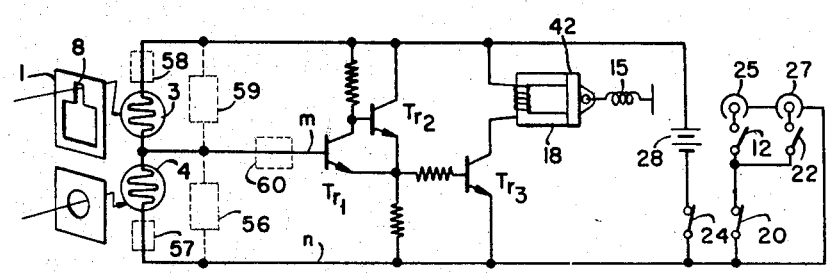
FIGURE 6 is a circuit diagram of a network embodying the present invention and illustrated in a shutter cocked condition.

Upon photographing, the release lever 23 is swung counterclockwise in FIG. 5 (the point $d$ in FIG. 2), the switch 24 is closed at the point $e$ of FIG. 2 so that the current source 28 is connected to the circuit (FIG. 6). At this time, the light from the object and incident upon the photoelectric element 3 is restricted and highly attenuated by the slit 8 of the shield plate 1 so that the resistance value of the photoelectric element 3 is far greater than that of the photoconductor or photoelectric element 4 which is connected in series with the photoelectric element and is always fully exposed to the light from the object. Accordingly, the voltage between the points $m$ and $n$ defining the input to a three transistor switch network 6 becomes sufficiently low so that the transistor $Tr_1$ becomes non-conductive while the transistors $Tr_2$ and $Tr_3$ become conductive whereby the electromagnet 18 is energized and attracts the iron armature 42 pivoted to the closing ring 16.

Further swing of the release lever 23 disengages the set ring 10 which then rotates counterclockwise under the influence of the spring 32. Owing to the rotation of the set ring 10 the flash bulb switch 22 is closed at the time $f$ of FIG. 2, thus, when necessary, lighting the flash bulb with light intensity as shown by the curve in FIG. 2. Shown in the drawings are flash bulb terminals 27 and electronic flash tube terminals 25.

Then, the pin 35 of the shield plate 1 engages the elevated portion 44 of the set ring 10 so that the shield plate 1 is so swung at the point $g$ of FIG. 2 that the photoelectric element 3 is exposed to the light in an unattenuated condition from the object, thus starting the exposure measurement. At this time, the arm 38 of the set ring 10 is separated from the closing medial lever 14, the closing ring 16 remains stationary because the armature 42 pivoted to the closing ring 16 is still retained by the electromagnet 18. Then, the set ring 10 rotates under the control of the governor 13. When the pin 52 of the opening lever 26 falls into the recess 53 of the set ring 10, the lever 26 swings clockwise so that the shutter blade 2 starts to be opened at the point $h$ of FIG. 2.

Figure 8:
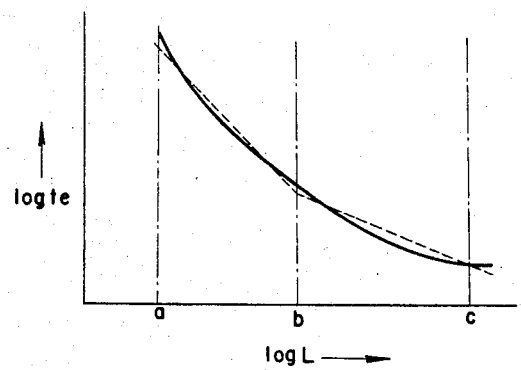
FIGURE 8 is a graph illustrating the relationship between object brightness and exposure time in accordance with the system of the present invention.

Considering the operation when the object is bright, that is, the brightness is within the range between the points $b$ and $c$ of FIG. 8, when the voltage between the points $m$ and $n$ of FIG. 6 reaches the trigger voltage value of the switching circuit, the transistor $Tr_1$ becomes conductive and reverses the state of the switching circuit, making the transistors $Tr_2$ and $Tr_3$ non-conductive. Accordingly, the current flowing through the winding of the electromagnet 18 is stopped. Thus the electromagnet 18 loses its attracting power so that, in FIG. 5, the armature 42 is released and the closing ring 16 rotates counterclockwise owing to the action of a closing ring spring 15 which is stronger than the spring 17. Therefore, the arm 51 abuts against the arm 50 of the opening lever 26 so as to swing the hitherto clockwise swinging opening lever 26 counterclockwise so that the shutter blade 2, which has been opening, now begins to be closed.

Now, in the above case, there is a delay time $t_r$ between the stoppage of current through the winding of the electromagnet 18 and complete closure of the shutter blade 2. Therefore, exposure measurement must be started before the time $h$ of FIG. 2 where the shutter blade 2 begins to be opened. Thus, exposure measurement must be started at the time $g$. The lapse of time $t_s$ between the points $g$ and $h$ must be approximately equal to said delay time $t_r$.

In the above case, the exposure waveform is a triangular wave as shown at A in FIG. 2 with an inclined leading edge, so that the characteristic between the points $b$ and $c$ of FIG. 8 should have a gradient of approximately 0.5, as shown in a dotted line. This is because when the exposure waveform is triangular, in connection to the area between the curve and the transverse axis, namely the exposure amount, the exposure time $t_e$ must be approximately inversely proportional to the square root of the object brightness L. Actually, the characteristic curve is as shown in a solid line, and the difference is so slight as not to seriously affect exposure accuracy.

When the object is less bright corresponding to the range between the points $a$ and $b$ of FIG. 8, the operation is as follows:

When the shutter blade 2 of FIG. 5 has reached fully open state in its aforementioned opening movement, that is, when the time $i$ of FIG. 2 is reached, in FIG. 5 the electronic flash switch 12 is closed due to the pin 11 insulatedly secured to the set ring 10 so that when desired the electronic flash is initiated at this moment. In this latter case, the diaphragm blades (not shown) must be set to a diaphragm value determined by the guide number of the electronic flash tube and the distance to the object. Immediately after closing the electronic flash switch 12, the set ring 10 is stopped by abutting against a stopper 54, retaining the shutter blade 2 in fully open state.

When, in response to the light incident upon the photoelectric element 3, the voltage between points $m$ and $n$ determined by the resistance ratio of the photoelectric elements 3 and 4 reaches the trigger voltage value $V_c$ of the switching circuit 6, the transistor $Tr_1$ becomes conductive so that the state of the switching circuit is reversed and the transistors $Tr_2$ and $Tr_3$ become non-conductive. Accordingly, the current flowing through the winding of the electromagnet 18 is stopped so that the electromagnet 18 releases the armature 42. Then, the closing ring 16 starts to rotate counterclockwise owing to the action of the closing ring spring 15 which is stronger than the spring 17 so that the arm 51 abuts against the arm 50 of the opening lever 26 to swing the lever 26 counterclockwise and close the shutter blade 2. Further, the closing ring 16 opens the safety switch 20 by the pin 19 insulatedly secured to the ring 16, and stops by abutting against the stopper 55 and thus finishes the shutter operation (FIG. 4). The safety switch 20 is provided to prevent an unintentional flash when a bulb or tube is connected to the terminal 25 or 27 respectively due to formation of a loop circuit 27→22→20 or 25→12→20.

In the above low light case the exposure waveform is trapezoidal as shown at B in FIG. 2 so that when the object is less bright as the range between the points $a$ and $b$ of FIG. 8 the relation between the object brightness L and exposure time $t_e$ must have a gradient of approximately 1.0 as shown in a dotted line. This is because when the exposure waveform is trapezoidal or rectangular, in connection with the area between the curve and the transverse axis, namely exposure amount, the exposure time $t_e$ must be approximately inversely proportional to the object brightness L. In this case the actual characteristic curve is as shown in a solid line, but this curve is closely approximate to the ideal characteristic as shown in a dotted line, so that exposure accuracy is not seriously effected.

Fundamentally, the photoelectric elements as shown in FIG. 6 produces a characteristic as shown in solid line in FIG. 8. In order to approximate this characteristic to the ideal characteristic as shown in dotted lines in FIG. 8, the ratio of the initial incident light intensity to the final incident light intensity of the photoelectric element 3, the value of the trigger level $V_e$ of the switching circuit, or the duration $t_s$ between the light measurement starting time $g$ and the shutter blade 2 opening starting time $h$ may be varied; and further, for this purpose the addition of compensating impedances 56, 57, 58, 59 and 60, as shown in dotted lines in FIG. 6 is effective. These compensating impedances may contain photoelectric elements.

FIG. 3 shows the operation of an arrangement wherein diaphragm blades, not illustrated in FIGS. 4 and 5, are provided. In this operation the diaphragm is preset and the shutter blades 2 rapidly open at the time $h$ of FIG. 3. The exposure waveform is mainly trapezoidal so that the characteristic shown between the points $a$ and $b$ of FIG. 8 may be used.

Figure 7:
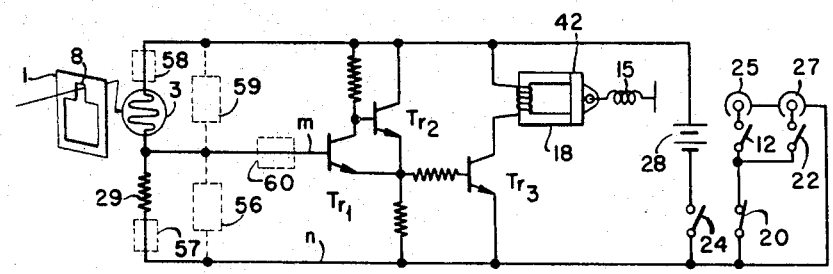
FIGURE 7 is a circuit diagram of another network embodying the present invention and illustrated in a shutter cocked position.

FIG. 7 shows a circuit for the case where the object brightness is restricted within a narrow range, and is intended for ready understanding of the circuit of FIG. 6, as will be explained later.

The principle of the present invention will be described in an approximate mathematical form for ready understanding. For simplification the computation is made under certain assumptions, but in case such assumption is, in fact, impossible, the fundamental nature of the present invention may still be expressed in this form. Actually, in some cases, the conditions as indicated below are preferably somewhat altered to obtain the optimum relation between the object brightness and exposure time in response to the exposure waveform.

For simplification assume that the circuit of FIG. 7 is without the compensating impedances 56, 57, 58, 59 and 60, that the resistance value $R_3$ of the photoelectric element 3 is always considerably greater than the resistance value $R_0$ of the resistor 29, and that the photoelectric element 3 initially receives no incident light and then an incident light momentarily impinges thereupon. Then, the current I(t) (function of time $t$) flowing through the photoelectric element 3 and the resistor 29 is approximately expressed as follows:

$$I(t) = I(L) \left\{ 1 - e^{-\frac{t}{T(L)}} \right\} \quad (1)$$

where L is the object brightness and I(L) is the final value of the current varying with time and flowing through the photoelectric element 3 or the resistor 29. I(L) is a function of the object brightness L and may be considered to approximately satisfy the relation $I(L)=K_1 L^\lambda$. This relation approximately corresponds to the well known relation $I'(L)=K'_1 L^\gamma$ expressing the current value $I'(L)$ flowing through a photoelectric element exposed for a long time to the light from the object to be photographed. The terms $\lambda$ and $K_1$ are of somewhat different nature from the terms $\gamma$ and $K_1'$ respectively, the respective values being also considered to be somewhat different. These may, however, be considered to be approximately equal to each other respectively. T(L) is the time constant of the current flowing through the photoelectric element 3 and varying with time. T(L) is also a function of the object brightness L and may be considered to satisfy the relation $$T(L) = \frac{1}{K_2}(L)^{-\mu}. \text{ Wherein, } K_1 \text{ and } \frac{1}{K_2}$$

are constants of proportionality.

Now, substituting the above relations concerning I(L) and T(L) in the above indicated Equation 1 we obtain:

$$I(t) = K_1 L^\lambda \left(1 - e^{-K_2 L^\mu t}\right) \quad (2)$$

For simplification we expand the Equation 2 and omit the second power term and further terms. The result is:

$$I(t) \fallingdotseq K_1 K_2 L^{(\lambda+\mu)} t \quad (3)$$

Assuming that time $t_e$ is required for the voltage $$V(t) = R_0 I(t)$$

across the resistor 29 of FIG. 7 with the value $R_0$ to reach the trigger voltage value $V_e$ of the switching circuit, then $$V_e = R_0 I(t_e) = R_0 K_1 K_2 L^{(\lambda+\mu)} t_e$$

$$t_e = \frac{V_e}{R_0 K_1 K_2} L^{-(\lambda+\mu)} \quad (4)$$

Accordingly, the exposure time $t_e$ is approximately inversely proportional to $(\lambda+\mu)$th power of the object brightness L. With reference to FIG. 8 showing the relation between the object brightness L and exposure time $t_e$, the slope $\Delta \log t_e/\Delta \log L$ approximately corresponds to $(\lambda+\mu)$. This slope generally tends to diminish as the brightness increases.

The above characteristic curve may be varied over a considerably wide range by changing the kind of the photoelectric element used, the ratio of initial to final incident light intensity upon the photoelectric element, the trigger voltage of the switching circuit or incident light diminution degree when entering the light receiving part; or by inserting compensating impedances 56, 57, 58, 59 and 60 in the photoelectric element circuit.

The functional relationship between the object brightness and exposure time may also be varied by varying functional waveform of incident light intensity of the photoelectric element 3 with respect to time by moving the shield plate 1, or, in connection with effective exposure time, by varying the time duration between the rise starting time of the incident light intensity waveform with respect to time and the shutter blade opening starting time.

Thus, it has been confirmed by experiment that it is possible to obtain a characteristic of FIG. 8 having an almost constant slope over a wide object brightness range, or one having a slope remarkably changing at a certain object brightness, for example at the point $b$, and also to make such slope approximately 1.0 or 0.5.

Accordingly, if the exposure program is as shown in FIG. 2, in order to obtain proper exposure, in the high object brightness range corresponding to triangular exposure waveform said slope should be approximately 0.5; and in the low object brightness range corresponding to trapezoidal exposure waveform said slope should be approximately 1.0. Further, if this slope is about 1.0 over the entire object brightness range, proper exposure may be obtained with a preset diaphragm exposure program as P or Q in FIG. 3.

The above method with a fixed value resistor 29 is applicable to a narrow object brightness range. However, if it is attempted to apply such method to a wide object brightness range, the trigger voltage $V_e$ of the switching circuit must be of very low value so that the switching circuit would be cumbersome and it would be difficult to attain high stability. Therefore, preferably there are provided photoelectric elements 3 and 4 which are connected in series to the current source, and the voltage across the photoelectric element 4, which varies with time, is applied to the switching circuit as an input so as to automatically control the exposure operation. In this case also, however, the operation is fundamentally similar to that of said method with a fixed value resistor 29 as shown in FIG. 7.

The operation of the above case will be described below in approximate mathematical form:

In order to determine the current $I(t)$ flowing through the photoelectric elements 3 and 4, assume that the resistance $R_3$ of the photoelectric element 3 is always greater than the resistance $R_4$ of the photoelectric element 4, that the compensating impedances 56, 57, 58, 59 and 60 as shown in FIG. 6 are not inserted in the circuit, and that incident light momentarily impinges upon the photoelectric element without initial incident light. Then, the current $I(t)$ flowing through the photoelectric element 4 as a function of time may be considered as indicated by the Equation 3: $I(t) \doteq K_1 K_2 L^{(\lambda+\mu)} t$. Accordingly, if the time $t_e$ is required for the voltage $R_4 I(t)$ across the photoelectric element 4 to reach the trigger voltage value $V_e$ of the switching circuit. Then, because there is established an approximate relationship: $R_4 = K_3 L^{-\gamma}$, $$V_e = R_4 I(t_e)$$
$$= K_3 L^{-\gamma} K_1 K_2 L^{(\lambda+\mu)} t_e$$
$$= K_1 K_2 K_3 L^{(\lambda+\mu-\gamma)} t_e$$
$$t_e = \frac{V_e}{K_1 K_2 K_3} L^{-(\lambda+\mu-\gamma)} \quad (5)$$

Accordingly, the functional relationship between the object brightness and exposure time may be made such that produces proper exposure by selecting suitable values for the constants. In this case also, the general appearance of the characteristic curve indicating the object brightness $L$ and exposure time $t_e$ is like that of the curve of FIG. 8. The slope of the characteristic curve, namely $\Delta \log t_e / \Delta \log L$ corresponding to $(\lambda+\mu-\gamma)$ of the Equation 5 varies with the object brightness in a manner similar to that of the case of FIG. 7 using a fixed value resistor 29. The characteristic curve may be varied to obtain the desired characteristic by using the various methods described in the case of FIG. 7 using a fixed value resistor 29. The characteristic is applicable to the exposure programs as shown in FIGS. 2 and 3.

Automatic exposure control according to the present invention is possible also in the case of flash bulb photography as described below:

As shown in FIG. 2, if the flash bulb switch 22 is closed before the aperture for the photoelectric element 3 begins to change, that is, before the intensity of the light incident upon the photoelectric element 3 begins to increase, thereby causing light due to the flash from the object to impinge upon the photoelectric element 3 in such a way that the incident light intensity waveform with respect to time approximates a rectangular wave, then the variation of the intensity of the light incident upon the photoelectric element 3 is almost the same as that of ordinary photographing operation without use of a flash bulb.

The object brightness after shutter blade opening and flash intensity waveform are considered to be approximately rectangular, so that with respect to this point also the condition may be considered to be approximately the same as that of ordinary photographing operation. As the incident light of the photoelectric element 4, the initial rising flash intensity is applied before the intensity of the light incident upon the photoelectric element 3 is changed owing to the action of the shield plate 1, so that approximately an operation similar to that of ordinary photographing operation is carried out.

Flash bulb photography is considerably different from ordinary photographing operation in that the incident light intensity of the photoelectric element 3 is not constant but varies with time. However, the fundamental operation is as indicated by the Equation 5. It is experimentally confirmed that automatic exposure control for flash bulb photography with proper exposure is possible with considerable accuracy by adding compensating impedances 56, 57, 58, 59 and 60 to the photoelectric element 4 when the flash bulb is used, by restricting incident light to the photoelectric elements 3 and 4, or by varying the trigger voltage value $V_e$. With some type of photoelectric element exposure accuracy is improved if a fixed value resistor is added in parallel with the photoelectric element 4. In this case it would be fundamentally possible to consider the operation to be approximately midway between the two operations corresponding respectively to the Equations 4 and 5.

In connection with the relationship between the object brightness and exposure time when a flash bulb is used, it is confirmed that in the curve of FIG. 8 the slope can be made about 0.5 in high brightness range, about 1.0 in low brightness range or about 1.0 in high to low range. Accordingly, application can be made to the programs as shown in FIGS. 2 and 3.

According to the present invention, as readily understood from the above description, the flash bulb light intensity is approximately equivalent to the state wherein it is constant before it is brought to a steady state, so that if a considerable ambient light exists in addition to the flash bulb light, exposure control is advantageously carried out with respect to the brightness due to the light including said ambient light.

In a method wherein the diaphragm is determined by the relationship $G = F \times D$ (G: guide number of flash bulb; F: diaphragm value; D: distance to object), in the following cases to determine the diaphragm value by compensation is troublesome and it is difficult to perform an accurate exposure: In the case wherein ambient light of high intensity exists; in the case wherein the object is not directly illuminated by the flash bulb but indirectly illuminated by the light of same which is reflected by the wall; or in the case wherein the flash bulb is covered by a cloth so as to soften the light. According to the present invention, however, in these cases proper exposure can be automatically carried out without any human compensating operation.

If the program as shown in FIG. 2 is used, when the shutter blades begin to open the flash bulb has been already lighted. If the time of about 10 ms. is required to have the shutter blades fully opened and a small flash bulb such as type AG-1 is used, for the farthest object of which the exposure can be automatically controlled, only about half the total light amount of the flash bulb is effectively used. Theoretically, with the smallest presently available flash bulb AG-1 (guide number 32) and the diaphragm value F2, an object as far as 16 meters away may be photographed. According to the present invention, this distance is merely diminished to about 11 meters. This scarcely exerts any influence upon ordinary flash bulb photographing operation.

With an electronic flash tube which momentarily illumniates the object only once at a time, the system of the present invention cannot perform automatic exposure control. In this case the electronic flash switch 12 must be used which is closed after the shutter blades are fully opened.

However, with an electronic flash tube flashing in rapid succession, proper exposure may be carried out by the arrangement according to the present invention.

If there is provided an electronic flash tube illuminating device which is triggered by a switch and makes flash operations in rapid succession for at least about 30 ms., then with this device triggered by the flash bulb switch 22 automatic exposure control can be carried out by the arrangement according to the present invention. In this case, however, it is necessary to change the compensating impedances of the input circuit including the photoelectric element and to change the trigger voltage value of the switching circuit.

Thus, it is clear from the above that the present invention is based on a principle which is entirely different from that of the conventional automatic exposure control shutter: The response delay time of an electrical property of a photoelectric element, which delay time appears when the incident light intensity changes, varies with the object brightness. Such phenomenon is effectively and stably applied to the automatic exposure control of a camera shutter. The present invention is of such wide application range that it may be applied to an exposure program wherein exposure time is automatically controlled with respect to a preset diaphragm, or another exposure program wherein with respect to one object brightness one constant combinational relationship is predetermined between shutter blade aperture and exposure time. Further, in the case of flash bulb photography, automatic exposure control can be performed with considerable accuracy. The electrical circuit and the mechanism are relatively simple so that the arrangement affords great practical and industrial advantage.

In the aforementioned example weaker light is incident upon the photoelectric element at the initial part of shutter operation. Conversely, stronger light may be initially incident upon the photoelectric element, which light will then be weakened as the shutter operates. In effect, the incident light intensity should be changed upon shutter actuation. In the above latter case, however, it is necessary to change the arrangement of the photoelectric elements in the input circuit or the structure of the switching circuit.

While there have been described and illustrated preferred embodiments of the present invention it is apparent that numerous alterations, omissions and additions may be made without departing from the spirit thereof.

What is claimed is:

1. An automatic camera comprising a shutter, means for effecting the opening of said shutter, a photosensitive element exposed to light incident on said camera, means responsive to said shutter opening means for varying the attenuation of said incident light directed to said photosensitive element, and means responsive to an electrical characteristic of said photosensitive element which varies with time attendant to said attenuation variation for effecting the closing of said shutter.

2. The camera of claim 1 wherein said photosensitive element comprises a photoconductor having a resistance varying inversely with time and the intensity of the light incident thereon, and said shutter closing means is responsive to said resistance.

3. The camera of claim 2 wherein said attenuation varying means reduces said light attenuation attendant to the opening of said shutter.

4. The camera of claim 2 wherein said attenuation varying means includes a member movable between a low attenuation and a high attenuation position and permitting the passage of some light to said photoconductor when in said high attenuation position.

5. The camera of claim 2 including a second photoconductor connected in series with said other photoconductor and exposed to said incident light.

6. The camera of claim 2 including a resistor connected in series with said photoconductor.

7. The camera of claim 1 wherein said photosensitive element includes a first photoconductor having a resistance varying inversely with time and the intensity of the light incident thereon, and comprising a switch network including an input and an output, a source of current, means including a resistor connecting said photoconductor across said source of current, said resistor being coupled across said switch input, said attenuation varying means including a masking member movable across the light path to said photoconductor between a low attenuation position and a high attenuation position and responsive to the opening sequence of said shutter to move from said high attenuation to said low attenuation position, said shutter closing means including an electromechanical transducer coupled to the output of said switch and controlling the closing of said shutter.

8. The camera of claim 7 wherein said resistor comprises a second photocnductor exposed to said camera incident light.

9. The camera of claim 7 wherein said masking member is responsive to move to said low attenuation position a predetermined period before the opening of said shutter.

10. The camera of claim 2 including a photoflash switch and means responsive to said shutter opening means for closing said switch prior to the actuation of said attenuation means.

11. The camera of claim 1 wherein said photosensitive element is a photoconductor having a resistance varying inversely with time and the intensity of the light incident thereon and said shutter closing means comprises an electromechanical transducer and a switch network having a control input signal varying with said resistance and an output coupled to said transducer.

12. The camera of claim 11 wherein said attenuation varying means includes a masking member movably across the light path to said photoconductor between a low attenuation and a high attenuation position and responsive to the opening sequence of said shutter to move from said high attenuation to said low attenuation position.

13. An automatic exposure control shutter of a photographic camera comprising shutter operating means which operate the shutter arrangement so as to control the light amount passing through the shutter arrangement, a switching circuit for actuating said shutter operating means, means for causing said switching circuit to actuate said shutter operating means, a photoresponsive element which is exposed to the light from the object and varies in an electrical property value in response to the incident light amount, attenuator means which so operates in association with the actuation of said shutter operating means as to rapidly change the light amount incident upon said photoresponsive element, and manually controllable means for actuating said shutter operating means; the action of said attenuator means due to the actuation of said controllable means causing variation with time of the electrical property value of said element so that, in accordance with the time duration from start of operation of said attenuator means to the time said property value reaches a certain value, the time duration from start of operation of said attenuator means to changeover of said switching circuit varies, thereby controlling the light amount passing through the shutter arrangement.

References Cited

UNITED STATES PATENTS 3,292,515  12/1966  Sato et al.
3,292,516  12/1966  Sato et al.

NORTON ANSHER, Primary Examiner
J. F. PETERS, JR., Assistant Examiner

U.S. Cl. X.R.
95—53; 250—229; 317—124